United States Patent [19]

Kashida et al.

[11] Patent Number: 4,766,507

[45] Date of Patent: Aug. 23, 1988

[54] ROTARY HEAD REPRODUCER WITH MEANS FOR DETECTING THE DIRECTION OF AUDIO RECORDING DURING SEARCHING

[75] Inventors: Motokazu Kashida, Tokyo; Masahiro Takei, Kanagawa; Kouji Takahashi, Kanagawa; Kenichi Nagasawa, Kanagawa, all of Japan

[73] Assignee: Canon Kabushiki Kaisha, Tokyo, Japan

[21] Appl. No.: 823,053

[22] Filed: Jan. 27, 1986

[30] Foreign Application Priority Data

Jan. 28, 1985 [JP] Japan .................................. 60-14074
Jan. 28, 1985 [JP] Japan .................................. 60-14075

[51] Int. Cl.[4] .................... G11B 27/19; G11B 15/467; G11B 5/09
[52] U.S. Cl. .................................. 360/72.2; 360/18; 360/19.1; 360/27; 360/48; 360/32; 360/73; 360/74.4
[58] Field of Search .................... 360/8, 9.1, 10.1–10.3, 360/13, 14.1–14.3, 18, 19.1, 20, 27, 32, 31, 48, 49, 69, 70, 71, 72.1, 72.2, 73, 74.1, 74.4, 75, 77

[56] References Cited

U.S. PATENT DOCUMENTS

| 3,019,422 | 1/1962 | Eachus | 360/72.2 |
| 3,789,138 | 1/1974 | Terada | 360/10.3 |
| 3,984,869 | 10/1976 | Fujii et al. | 360/73 |
| 4,558,378 | 12/1985 | Shibata et al. | 360/13 |
| 4,622,600 | 11/1986 | Okamoto et al. | 360/48 |

FOREIGN PATENT DOCUMENTS

| 57-15237 | 1/1982 | Japan | 360/10.1 |
| 59-221087 | 12/1984 | Japan | 360/27 |
| 60-258749 | 12/1985 | Japan | 360/27 |

Primary Examiner—Raymond F. Cardillo
Assistant Examiner—Steven R. Garland
Attorney, Agent, or Firm—Robin, Blecker & Daley

[57] ABSTRACT

An audio signal reproducing apparatus for reproducing audio signals from a tape-shaped recording medium on which the audio signals are recorded together with mark signals respectively showing the longitudinal positions of the audio signals along the medium is arranged to detect the moving direction of the medium taken in recording in response to an instruction given to detect one of the mark signals and to search out the mark signals by moving the medium in the direction determined according to the result of the detection.

29 Claims, 12 Drawing Sheets

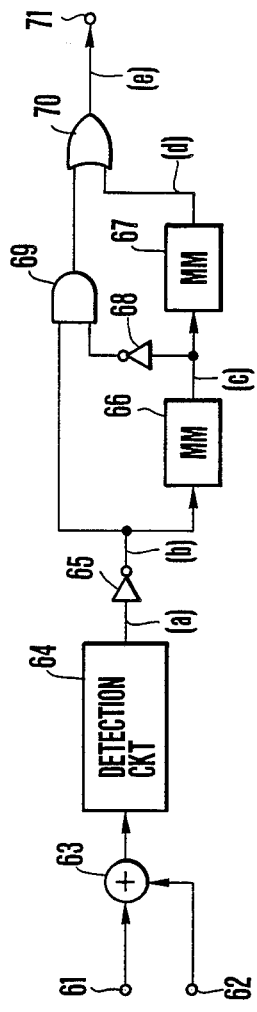
FIG. 5
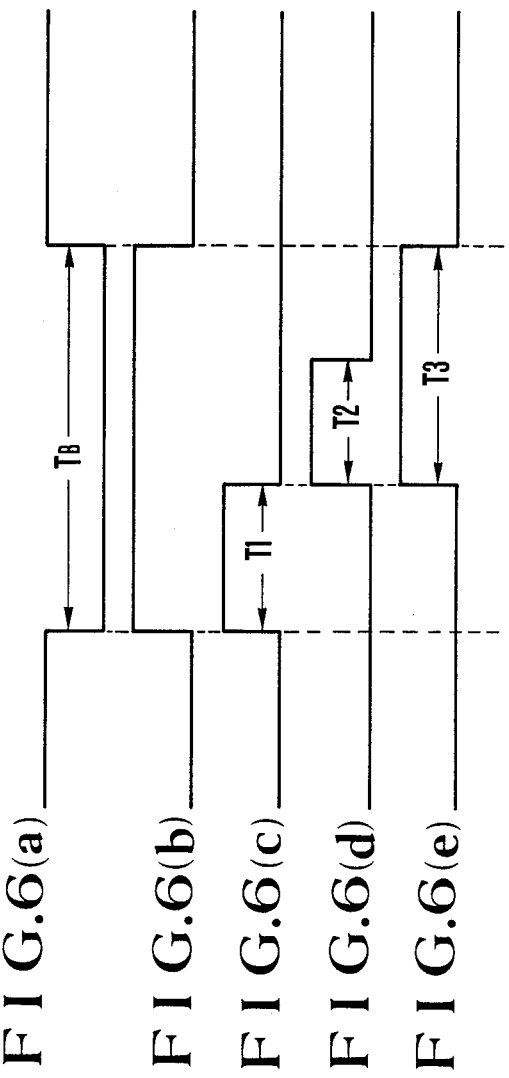
FIG.6(a)
FIG.6(b)
FIG.6(c)
FIG.6(d)
FIG.6(e)

ROTARY HEAD REPRODUCER WITH MEANS FOR DETECTING THE DIRECTION OF AUDIO RECORDING DURING SEARCHING

BACKGROUND OF THE INVENTION

1. Field of the Invention

This invention relates to an audio signal reproducing apparatus and more particularly to an apparatus arranged to reproduce audio signals from a recording medium having mark signals recorded along with the audio signals to show respectively the positions of the audio signal on the medium.

2. Description of the Prior Art

Heretofore, the audio signal recording and/or reproducing apparatuses have been arranged to perform various additional functions of identification. These functions include a head (or leader part) searching function which is considered indispensable particularly to the recording apparatus of the type arranged to permit long time recording and audio signal recording with a high degree of tone quality.

In accordance with the method conventionally employed for performing the head search function in an audio tape recorder, the tape is allowed to travel at a speed several to several tens of times as fast as the travelling speed employed in recording and then a mute or silent part of the signal thus reproduced with no sound is detected.

Meanwhile, as a result of the recent tendency of having audio signals of high sound quality, there have been proposed various audio signal recording methods of using rotary heads. For example, to obtain an audio signal with high fidelity in a video tape recorder, the audio signal is recorded with frequency modulation by a rotary head. In the case of a tape recorder adapted exclusively for audio signals, it is known to record an audio signal with digital modulation by a rotary head. Further, some known audio recorders are arranged to perform digital modulation recording by time-base compressing an audio signal.

Briefly described, an example of the conventional audio tape recorders of the kind performing digital modulation recording by time-base compressing an audio signal is arranged as follows: FIG. 1 of the accompaying drawings shows by way of example the tape transport system employed in the audio tape recorder of the abovestated kind. The illustration includes a magnetic tape 1; a rotary cylinder 2 which carries a pair of rotary heads 3 and 4. The heads 3 and 4 are thus arranged to obliquely trace the surface of the tape 1 in recording an audio signal on the tape. An audio signal tape recorder capable of exclusively recording audio signals in a total of six channels can be obtained by arranging it to record a time-base compressed audio signal in each of six areas formed on the tape 1 in the longitudinal direction thereof every time these heads 3 and 4 rotate 36 degrees.

The following briefly describes this tape recorder:

FIG. 1 shows the tape transport system of the abovestated tape recorder. FIG. 2 shows recording tracks formed on a tape by this tape recorder. While the head 3 or 4 traces distances from a point A to a point B, from the point B to a point C, from the point C to a point D, from the point D to a point E, from the point E to a point F and from the point F to another point G, audio signals can be recorded in areas CH1 to CH6. These areas CH1 to CH6 thus can be used for recording different audio signals therein respectively. An operation called azimuthoverwrite is performed on these areas. However, the tracks of these areas CH1-CH6 do not have to be on the same straight line. Each of the areas CH1-CH6 has one pilot signal recorded therein for tracking control. Different pilot signals are thus recorded in different areas in the order of rotation f1→f2→f3→f4. However, there is no correlation between them.

Referring further to FIG. 1, recording or reproduction is carried out in or from these areas CH1 to CH3 while the tape 1 is travelling at a predetermined speed in the direction of arrow 7 and in or from the areas CH4 to CH6 while the tape is travelling in the direction of arrow 9. Therefore, as shown in FIG. 2, the inclination of the areas CH1 to CH3 somewhat differs from that of the areas CH4 to CH6. With regard to a difference in the relative speed of the tape and the head for these groups of areas, a difference arising from the travel of the tape 1 is extremely small as compared with a difference arising from the rotation of the heads 3 and 4. Therefore, the difference in the relative speed presents no problem.

FIGS. 3(a) to 3(j) show in a time chart the recording or reproducing operation of the tape recorder which is arranged as described above. A phase detection pulse (hereinafter referred to as a PG signal) which is generated in synchronism with the rotation of the cylinder 2 as shown at FIG. 3(a). The PG signal is of a rectangular wave of 30 Hz repeating a high level (hereinafter referred to as an H level) and a low level (hereinafter referred to as an L level) alternately with each other at intervals of 1/60 sec. Another PG signal which is of the opposite polarity to the PG signal of FIG. 3(a) is shown in FIG. 3(b). The first PG signal is at an H level while the head 3 is rotating from the point B to the point G of FIG. 1. The other PG signal shown in FIG. 3(b) is at an H level while the other head 4 is rotating from the point B to the point G.

Pulses for reading data are obtained from the PG signal of FIG. 3(a) as shown in FIG. 3(c). The data reading pulses are used for sampling the audio signal of a period corresponding to one field (1/60 sec). FIG. 3(d) shows by H level parts thereof periods provided for signal processing on the one field portion of the sampled audio data by adding an error correcting redundant code or by changing the arrangement thereof by means of a RAM or the like. FIG. 3(e) shows a signal indicating data recording periods at H level parts thereof which represent timing for recording, on the tape 1, the recording data obtained through the signal processing operation mentioned above.

Referring to FIGS. 3(a) to 3(j), the temporal flow of signals are, for example, as follows: The data sampled during a period from a point of time t1 to a point of time t3, i.e. while the head 3 is moving from the point B to the point G, is subjected to a signal processing operation during a period from the point of time t3 to a point of time t5, i.e. while the head 3 is moving from the point G to the point A and are then recorded during a period from the point of time t5 to a point of time t6, or while the head 3 is moving from the point A to the point B. In other words, the data is recorded by the head 3 in the area CH1 as shown in FIG. 2. Meanwhile, the data which is sampled while the PG signal of FIG. 3(b) is at an H level is also processed at a similar timing before it is recorded in the area CH1 by the head 4.

FIG. 3(f) shows another PG signal which is obtained by shifting the phase of the PG signal of FIG. 3(a) to a predetermined degree, which corresponds to one area and is 36 degrees in this specific instance.

An audio signal recording operation using the PG signal of FIG. 3(f) and PG signal which is not shown but is of an opposite polarity to the former is performed in the following manner: The data which is sampled during a period between the points of time t2 and t4 is subjected to a signal processing operation during a period between the points of time t4 and t6 in accordance with the signal of FIG. 3(g) and is recorded during a period between the points of time t6 and t7 in accordance with the signal of FIG. 3(h). In other words, the data is recorded in the area CH2 of FIG. 2 while the head is moving from the point B to the point C. Meanwhile, another data which is sampled during the points of time t4 and t7 is likewise recorded in the area CH2 by means of the other head during a period between the points of time t4 and t7.

The signal which is recorded in the area CH2 in the manner as described above is reproduced in the following manner:

The head 3 reads the data from the tape 1 in accordance with a signal shown in FIG. 3(h) during the period between the points of time t6 and t7 (and also during the period between the points of time t1 and t2). Then, during the period between the points of time t7 and t8 also (between t2 and t3), the reproduced signal is subjected to a signal processing operation which is carried out, in a manner reverse to the signal processing operation performed for recording, in accordance with a signal shown in FIG. 3(i). In other words, error correction and other processes are carried out during this period. Then, during a period between points of time t8 and t9, the reproduced audio signal which has been thus processed is produced in accordance with a signal shown in FIG. 3(j). The reproducing operation of the head 4 is of course performed with a phse difference of 180 degrees from the above-stated reproduction by the head 3, so that a continuous reproduced audio signal can be obtained.

For other areas CH3 to CH6, it goes without saying that the recording and reproducing operations are performed on the basis of the PG signal of FIG. 3(a) by phase shifting it as much as n×36 degrees. This is independent of the travelling direction of the tape.

It has thus become possible to utilize a VTR specially as a recorder capable of audio signal recording over a long period of time in multiple channel arrangement.

An audio tape recorder of this kind can be readily arranged, for example, to be capable of recording for 90 minutes in each of these channels. Then, the head search function becomes more important. However, there arises the following problem in cases where the direction (hereinafter referred to as "+" or "−" direction) in which the tape is allowed to travel for recording is unknown:

Assuming that some signal is recorded during recording together with an audio signal either between two programs or at a desired part designated by the operator for the purpose of leader search control (hereinafter referred to as an interlude signal), in searching out looking up a leader by detecting the interlude signal, the tape is generally allowed to travel at a high speed for shortening the period of time required for the search. In the case of such a search, the apparatus is preferably arranged to permit designation, before the search, of a desired program, such as designating a search for an audio signal of (+n) after an "n" program or a search for an audio signal of (−m) before an "m" program. However, making such designation is impossible if the "+" or "−" direction in which the tape has travelled for recording is unknown, because: It is impossible to decide in which of the two directions the tape should be moved at a high speed after the designation of "+n" or "−m".

Further, the apparatus is generally arranged to be automatically shifted to the reproduction mode after the search. However, in the above-stated instance, it is impossible to decide in which of the two directions the tape is to be allowed to travel, the "+" direction or "−" direction?.

In a conceivable solution of this problem, some data indicative of the "+" and "−" tape travel directions are arranged to be recorded during a recording operation in addition to the audio signal and pilot signals for tracking control (hereinafter referred to as TPS). This solution, however, necessitates arrangement to record the data in such a format that permits adequate reproduction at a high tape travel speed. Then, the latitude allowable to the recording format for the audio signal would be greatly restricted by such arrangement. This solution is, therefore, not desirable.

In another conceivable solution, either the tape is brought to a stop or the apparatus is shifted to the reproduction mode upon detection of the interlude signal. However, such mode shifting cannot be effected at the recorded position of the interlude signal due to the inertia. Therefore, in the event of a high density record, a portion of the desired program immediately following the leader thereof would be omitted from reproduction with the tape moved at a high speed in the same direction as the recording tape moving direction; or a portion immediately before the end of another program recorded before the desired one would come to be reproduced with the tape moved at the high speed in the direction reverse to the recording direction.

SUMMARY OF THE INVENTION

It is a principal object of this invention to provide an audio signal reproducing apparatus which is capable of solving the above-stated problems of the prior art.

It is another object of this invention to provide an audio signal reproducing apparatus which is capable of promptly reproducing any desired audio signal recorded on a tape-shaped recording medium.

An audio signal reproducing apparatus arranged under this object as an embodiment of this invention to reproduce audio signals from a tape-shaped recording medium on which the audio signals are recorded together with mark signals respectively showing the longitudinal positions of the audio signals along the medium comprises: Moving means for moving the medium in the longitudinal direction thereof; reproducing means for reproducing the audio signals from the medium; look-up means for looking up one of the mark signals recorded on the medium; instruction means for instructing the look-up means to begin to look up the mark signal; discriminating means for discriminating, in response to an instruction received from the instruction means, a tape moving direction taken in recording the audio signals; and control means for controlling the moving means to begin to move the medium in the direction determined on the basis of the discrimination output produced from the discriminating means.

It is a further object of this invention to provide an audio signal reproducing apparatus which is capable of preventing occurrence of mis-reproduction caused by moving a tape-shaped recording medium in a direction reverse to the direction taken in recording; and is capable of adequately reproducing a desired audio signal.

An audio signal reproducing apparatus arranged under that object as another embodiment of this invention to reproduce audio signals from a tape-shaped recording medium on which the audio signals are recorded together with mark signals respectively showing the longitudinal positions of the audio signals along the medium comprises: Moving means for moving the medium in the longitudinal direction thereof; reproducing means for reproducing the audio signals from the medium; detecting means for detecting the mark signals from the medium; discriminating means for discriminating a direction in which the medium is allowed to travel when the audio signals are recorded; finding means for finding on the basis of the discrimination output of the discriminating means that the moving direction of the medium is reverse to the moving direction of the medium taken in recording when the medium is moved by the moving means at a first speed which is the same as the medium moving speed employed in recording; and control means for controlling the moving means in response to the output of the finding means to cause the moving means to move the medium at a second speed which is faster than the first speed in the direction reverse to the direction taken in recording until one of the mark signals is detected by the detecting means.

It is a still further object of this invention to provide an audio signal reproducing apparatus which is capable of accurately and promptly reproducing a desired audio signal recorded among others on a tape-shaped recording medium.

An audio signal reproducing apparatus arranged under that object as a further embodiment of this invention to reproduce audio signals from a tape-shaped recording medium on which the audio signals are recorded together with mark signals showing respectively the longitudinal positions of the audio signals along the medium comprises: Moving means for moving the medium in the longitudinal direction thereof; reproducing means for reproducing the audio signals from the medium; look-up means for looking up one of the mark signals recorded on the medium; stopping means for stopping the medium at a position where the medium enables the reproducing means to reproduce a part of the audio signal recorded on the medium before said one of the mark signals found by the look-up means; control means for controlling the moving means to cause the moving means, after the medium is brought to a stop by the stopping means, to move the medium in the same direction as the medium moving direction taken in recording; detecting means for detecting, while the medium is on the move under the control of the control means, that said one of the mark signals found by the look-up means is reproduced by the reproducing means; and muting means for muting the audio signal reproduced by the reproducing means after commencement of the lookup operation of the look-up means until completion of detection by the detecting means.

These and further objects and features of this invention will become apparent from the following detailed description of preferred embodiments thereof taken in conjunction with the accompanying drawings.

BRIEF DESCRIPTION OF THE DRAWINGS

FIG. 5 is a circuit diagram showing in detail a leader search control circuit included in the embodiment shown in FIG. 4.

FIGS. 6(a) to 6(e) show in a timing chart the operation of the circuit arrangement shown in FIG. 5.

DETAILED DESCRIPTION OF THE PREFERRED EMBODIMENT

Figure 1:
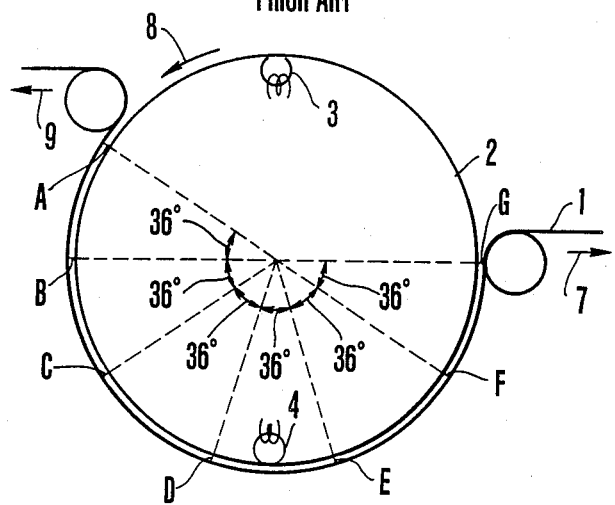
FIG. 1 is an illustration of the tape transport system of the conventional tape recorder.
Figure 2:
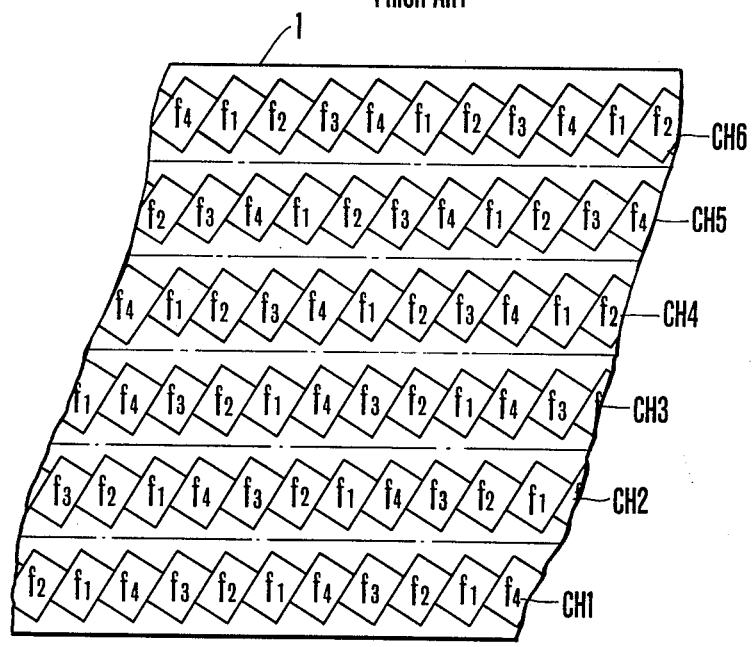
FIG. 2 is an illustration of the recording format employed by the tape recorder of FIG. 1.
Figure 3:
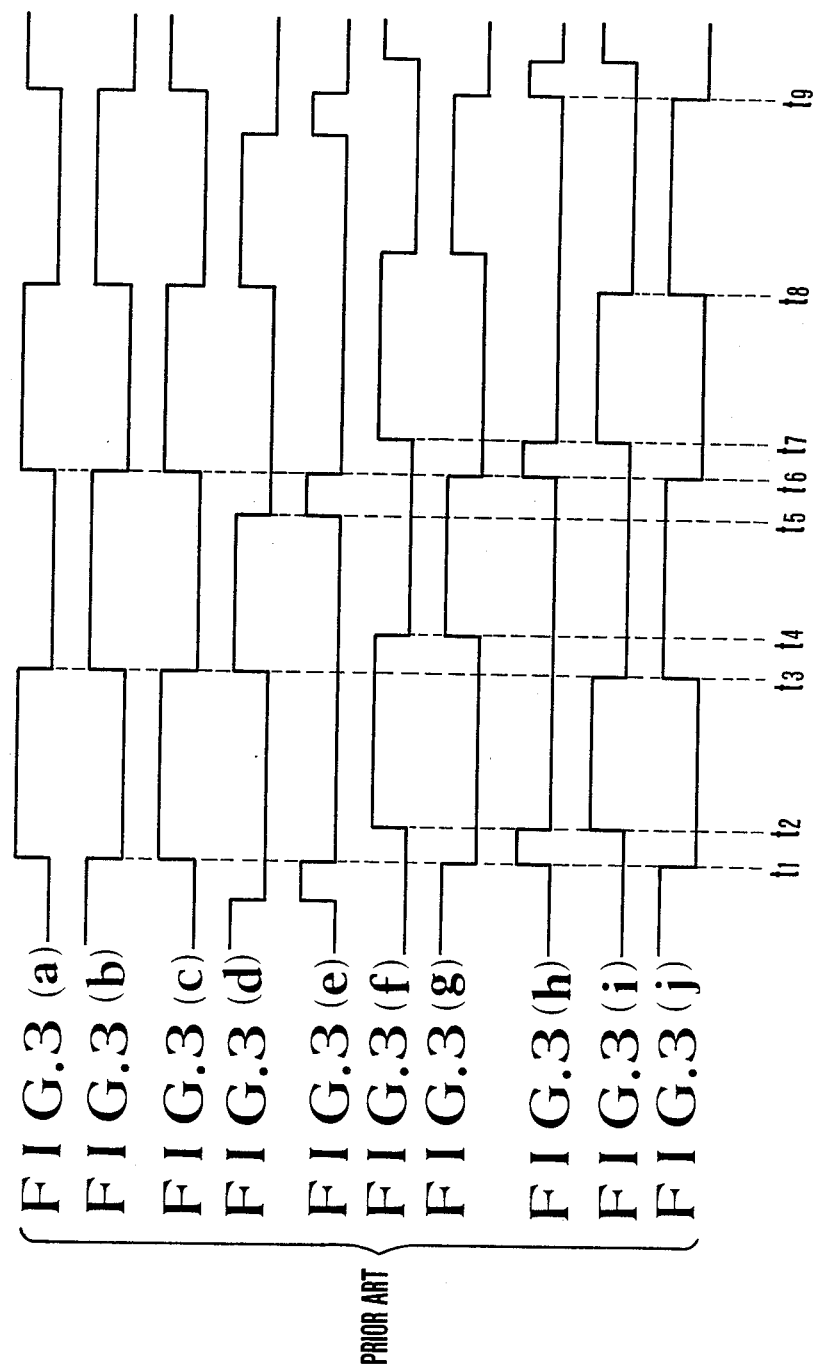
FIGS. 3(a) to 3(j) show in a timing chart the recording and reproducing operations of the tape recorder of FIG. 1.
Figure 4:
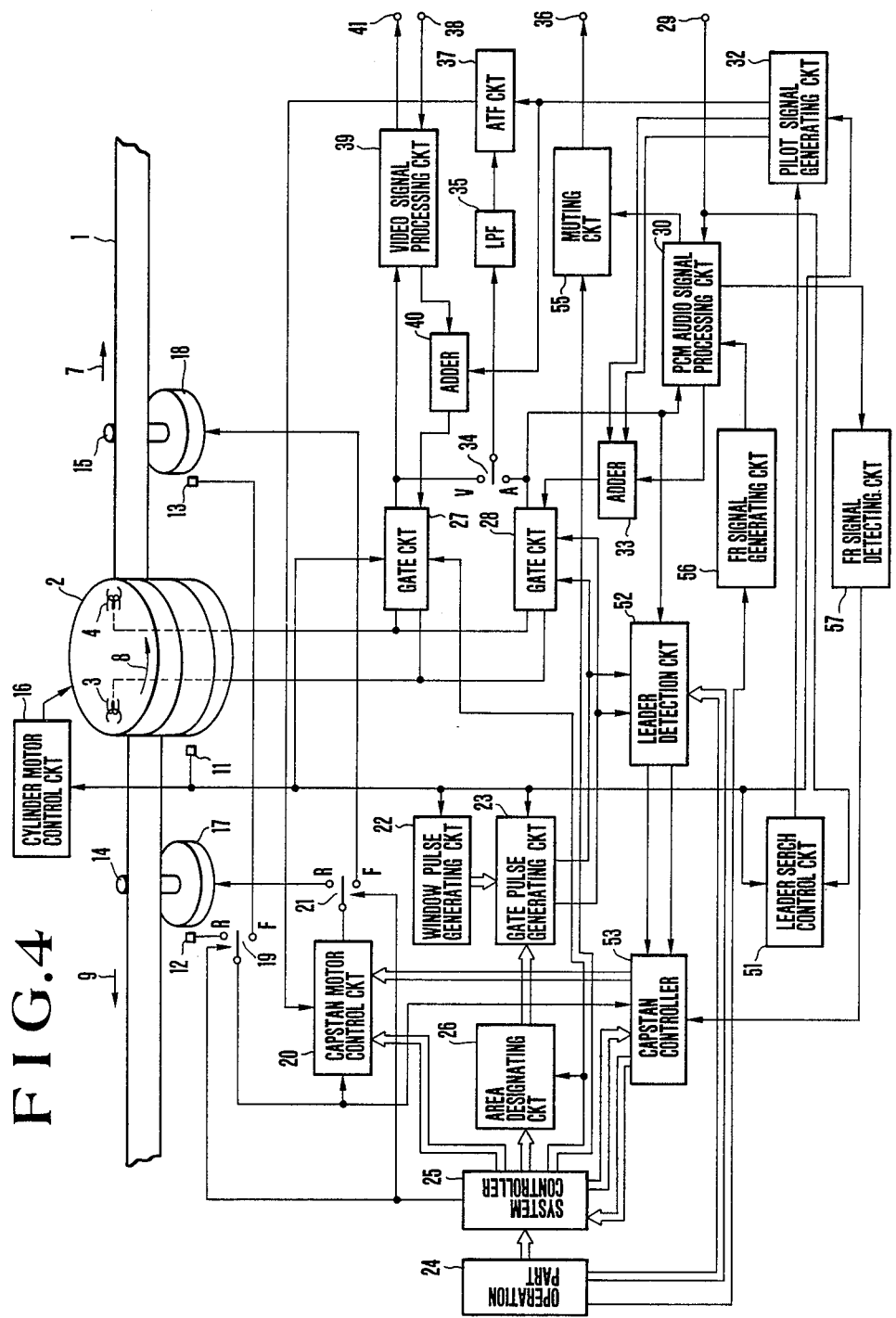
FIG. 4 is a diagram showing in outline the arrangement of a tape recorder which embodies this invention as an embodiment thereof.

An embodiment of this invention is arranged as described below:

FIG. 4 shows in outline the arrangement of a tape recorder embodying this invention. In FIG. 4, the same component elements as those shown in FIGS. 1 and 2 are indicated by the same reference numerals. A PG signal which is obtained from a detector 11 detecting the rotation of a rotary cylinder 2 is supplied to a cylinder motor control circuit 16. The circuit 16 causes the cylinder 2 to be rotated at a given speed and at a given rotation phase. Rotation detectors 12 and 13 are arranged to detect the rotation of the fly-wheels 17 and 18 of capstans 14 and 15. The outputs of these detectors 12 and 13 are selectively supplied via a switch 19 to a capstan motor control circuit 20. The output of the circuit 20 is supplied via a switch 21 to capstan motors to make the capstans 14 and 15 rotate at a given speed during recording. The switches 19 and 21 are arranged to be connected to their terminal F in moving a tape 1 in the direction of arrow 7 (forward) and to be connected to their terminals R in moving the tape 1 in the direction of arrow 9 (reverse).

Meanwhile, the above-stated PG signal is supplied also to a window pulse generating circuit 22 and a gate pulse generating circuit 23 respectively.

An operation part 24 is arranged to permit a manual operation for selection of a recording or a reproduction mode and for designating an area in which a recording or reproducing operation is to be performed. The part 24 also permits designation as to whether the recording is to be performed only for audio signals or video signals are also to be recorded in accordance with the recording pattern shown in FIG. 2. The data thus obtained at the operation part 24 is supplied to a system controller 25. The system controller 25 controls the capstan motor control circuit 20, the switches 19 and 21, an area designating circuit 26, a gate circuit 27 and a capstan controller 53. The area designating circuit 26 supplies the gate pulse generating circuit 23 with area designation data to obtain a desired gate pulse. In the event of recording audio signals along with video signals, the area to be designated is the area CH1. The gate pulse generating circuit 23 is arranged to selectively supply a gate circuit 28 with one of window pulses generated by the window pulse generating circuit 22 as a gate pulse for controlling the gate circuit 28 for each of the heads 3 and 4 on the basis of the area designation data.

During recording, an analog audio signal which comes from a terminal 29 is supplied to a PCM audio signal processing circuit 30. The signal is then sampled at a timing determined by the window pulse and is converted into digital data. The digital data is then subjected to the signal processing operation which is described in the foregoing. Recording audio data which is thus obtained is supplied to an adder 33 to be added together with tracking control pilot signals which are produced from a pilot signal generating circuit 32 in rotation for every field in the sequence of frequencies f1→f2→f3→f4 and also with other pilot signals which will be described later. The output of the adder 33 is suitably gated by the gate circuit 28 in the manner as described above. The output of the gate circuit 28 is then written into the desired area by the heads 3 and 4.

During reproduction, a signal reproduced by the heads 3 and 4 is extracted by the gate circuit 28 and is supplied to a low-pass filter (LPF) 35 via the terminal A of a switch 34. The signal is supplied also to the PCM audio signal processing circuit 30. The circuit 30 performs a signal processing operation on the reproduced signal including the processes of error correction, time-base expansion, digital-to-analog conversion, etc. in a manner reverse to the signal processing operation performed in recording. A reproduced analog signal thus processed is produced via a muting circuit 55 from a terminal 36.

The LPF 35 separates the tracking control pilot signals from the reproduced signal and supplies them to an ATF circuit 37. The ATF circuit 37 is arranged to produce a tracking error signal by the known four-frequency method. In obtaining the tracking error signal, the reproduced tracking control pilot signals are used together with pilot signals which are generated by the pilot signal generating circuit 32 in rotation in the same sequence of frequencies as in recording in a manner which is well known. However, in case that the embodiment is used solely for audio signals, the tracking error signal is obtained for every area and is sampled and held. The tracking error signal which is thus obtained is supplied to the capstan motor control circuit 20. Upon receipt of the tracking error signal, the circuit 20 performs tracking control by controlling the reproducing travel of the tape 1 through the capstans 14 and 15.

A leader search (or look-up) control circuit 51 is arranged to determine a timing for recording the interlude signal mentioned in the foregoing. A leader detecting circuit 52 is arranged to detect a leader part mentioned in the foregoing by reproducing the interlude signal. An FR signal generating circuit 56 is arranged to generate a signal indicative of the direction in which the tape is allowed to travel for recording (hereinafter referred to as FR signal) in response to an operation performed on the operation part 24. An FR signal detecting circuit 57 is arranged to supply the capstan controller 53 with data representing the tape moving direction taken in recording as will be further described later. These circuits are used for a leader (or head) search (or look-up) operation which will be described later in detail.

Next, recording and reproduction of a video signal is performed as follows: Upon receipt of a video signal recording instruction from the system controller 25, the area designating circuit 26 designates the area CH1 and causes the gate circuit 27 to operate according to the PG signal. A video signal which comes through a terminal 38 is made into a signal form suited for recording by a video signal processing circuit 39. After that, the signal is supplied to an adder 40 to be added together with pilot signals obtained from the pilot signal generating circuit 32. Then, the output of the adder 40 is supplied via the gate circuit 27 to the heads 3 and 4 to be recorded in the applicable part of the areas CH2 to CH6. In this instance, the PCM audio signal is recorded in exactly the same manner as the recording operation described in the foregoing. In the case of reproduction, video signals picked up by the heads 3 and 4 are combined into a continuous signal via the gate circuit 27. The continuous signal is supplied to the video signal processing circuit 39 to be brought back into its original signal form and is produced from a terminal 41. Further, the continuous signal which is obtained from the gate circuit 27 is supplied also to the LPF 35 via the terminal V of the switch 34.

The LPF 35 then continuously separates the pilot signal components of the incoming signal. The separated pilot signal components are supplied to the ATF circuit 37. In this instance, a tracking error signal thus obtained from the ATF circuit 37 does not have to be sampled and held and is thus supplied directly to the capstan motor control circuit 20. At that time a PCM audio signal is also reproduced from the area CH1. The reproduced PCM audio signal is supplied to the muting circuit 55 and an analog audio signal is thus reproduced from the terminal 36. However, in this instance, the tracking control using the output signal of the gate circuit 28 is not performed.

The tape recorder of this embodiment is arranged to perform the leader search out function in the following manner: FIG. 5 shows by way of example the details of arrangement of the leader search control circuit 51 shown in FIG. 4. FIGS. 6(a) to 6(e) show in a timing chart the wave forms of the outputs of various parts of FIG. 5. Referring to FIG. 5, a terminal 61 is arranged to receive a recording audio signal of a channel L. A terminal 62 is arranged to receive a recording audio signal coming from a channel R. An adder 63 is arranged to temporarily bring the incoming stereo-signal back into a monaural audio signal.

When the recording audio signal ceases to arrive, there obtains a mute state. The output signal level of the adder 63 drops. A detection circuit 64 is arranged to perform an envelope detection, etc. on the signal produced from the adder 63. When the level of this detection output which is as shown in FIG. 6(a) becomes lower than a given threshold level, the output of an inverter 65 changes to a high level as shown in FIG. 6(b). The mute state obtains while the output of the inverter 65 is at the high level. A monostable multivibrator (hereinafter referred to as MM) 66 is triggered by the rise of the output of the inverter 65. The output of the MM 66 changes to a low level after the lapse of a predetermined period of time T1 as shown in FIG. 6(c). Then, at the same time, the output level of another inverter 68 becomes a high level. This causes the output level of an AND gate 69 and that of an OR gate 70 shown in FIG. 6(e) to become also high. Meanwhile another MM 67 is triggered by the fall of the output level of the MM 66. The output level of the MM 67 changes to a low level after the lapse of a predetermined period of time T2 as shown in FIG. 6(d). The OR gate 70 is arranged to receive the output of the AND gate 69 and that of the MM 67. The output level of the OR gate 70 becomes low when the output levels of the inverter 65 and the MM 67 change to low levels.

In FIGS. 6(a) to 6(e), the illustration represents a case where the mute period is longer than the sum of the periods of time T1 and T2. In this case, assuming that the mute period is expressed as TB, a period of time T3 during which the output of the OR gate 70 is at a high level can be expressed as T3=TB−T1. In the event of T1<TB<T2+T1, there obtains a relation T3=T2 as apparent from FIGS. 6(a) to 6(e). If TB<T1, there obtains a condition T3+0.

The output of the OR gate 70 is supplied via a terminal 71 to the pilot signal generating circuit 32. Then, a pilot signal for leader detection which will be described later is multiplexed only during the period T3 together with a digital modulated audio signal coming through the PCM audio signal processing circuit 30.

In searching out or looking up a leader part, an interlude must be first detected. In order to avoid mistaking a short mute period for an interlude, a period T1 is set for an interlude. Any mute period shorter than this period T1 is not regarded as an interlude. The period T1 is preferably set at two seconds or thereabout, for example. The period T1 of course may be set at any other suitable length of time.

Next, the period T2 is determined according to the ratio of tape travel speed to be employed for leader search to the recording tape travel speed. In other words, the period T2 is set at a length of time sufficiently long to enable the leader searching or detecting pilot signal to be detectable with the tape allowed to travel at a high speed. For example, in case that the tape is to be moved at a searching speed which is 30 times as fast as the recording tape speed, the period T2 is set at a length of time of at least 30/60 sec. In the event of detection to be made a plurality of times (x times), it becomes at least x/2 sec. However, setting the period T2 at an excessively long period would cause the leader searching pilot signal to be recorded also in a part other than a record part which is actually in the mute state and, therefore, is not desirable.

Figure 7:
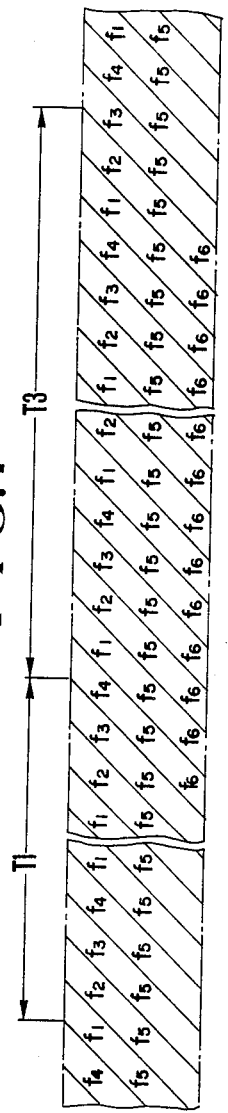
FIG. 7 shows the recorded state of pilot signals in a leader part to be searched out.

FIG. 7 shows the recorded state of the pilot signals recorded in a leader part which is to be searched out. In FIG. 7, a part T1 corresponds to the period T1 shown in FIG. 6(e). A part T3 corresponds to the period T3 of FIG. 6(e). Reference symbols f1 to f4 denote the frequencies of the tracking control pilot signals (TPS's). A symbol f5 denotes the frequency of a pilot signal for detection of a recorded state which is recorded in every part where the PCM audio signal is recorded (hereinafter referred to as MTS signal). A symbol f6 denotes the frequency of a pilot signal for leader searching (hereinafter referred to as BDS signal).

Figure 8:
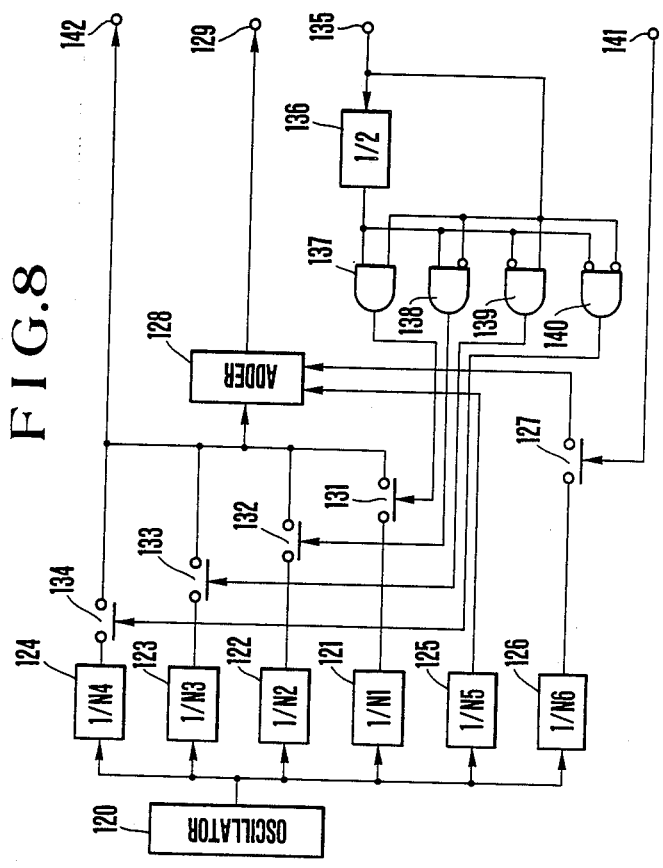
FIG. 8 is a circuit diagram showing in detail the arrangement of a pilot signal generating circuit included in the embodiment shown in FIG. 4.

FIG. 8 shows by way of example the details of arrangement of the pilot signal generating circuit of FIG. 4. Referring to FIG. 8, a standard frequency signal generated by an oscillator 120 is supplied respectively to frequency dividers 121 to 126 which are of different frequency dividing ratios. The frequency dividers 121, 122, 123 and 124 of frequency dividing ratios 1/N1, 1/N2, 1/N3 and 1/N4 respectively produce the TPS signals of frequencies f1, f2, f3 and f4. The frequency dividers of frequency dividing ratios 1/N5 and 1/N6 produce the MTS signal of frequency f5 and the BDS signal of frequency f6. A terminal 135 is arranged to receive the PG signal. With the PG signal frequency divided by a ¼ frequency divider 136, logic gates 137, 138, 139 and 140 produce high level outputs one after another for every field. As a result, analog switches 131, 132, 133 and 134 are turned on one after another for every field. The TPS signals of frequencies f1, f2, f3 and f4 are then supplied to an adder 128 in rotation in the sequence of frequencies f1→f2→f3→f4.

A terminal 141 is arranged to receive the output of the above-stated leader search control circuit 51. A switch 127 is arranged to supply the adder 128 with the pilot signals of frequencies f5 and f6 when the output of the circuit 51 is supplied to the terminal 141 at a high level and with only the pilot signal of the frequency f5 when the terminal 141 is not receiving the high level output. The adder 128 adds these pilot signals together. The output of the adder 128 is supplied via a terminal 129 to the adder 33. Meanwhile, the TPS signals are supplied via a terminal 142 also to the adder 34 and the ATF circuit 37.

Figure 9:
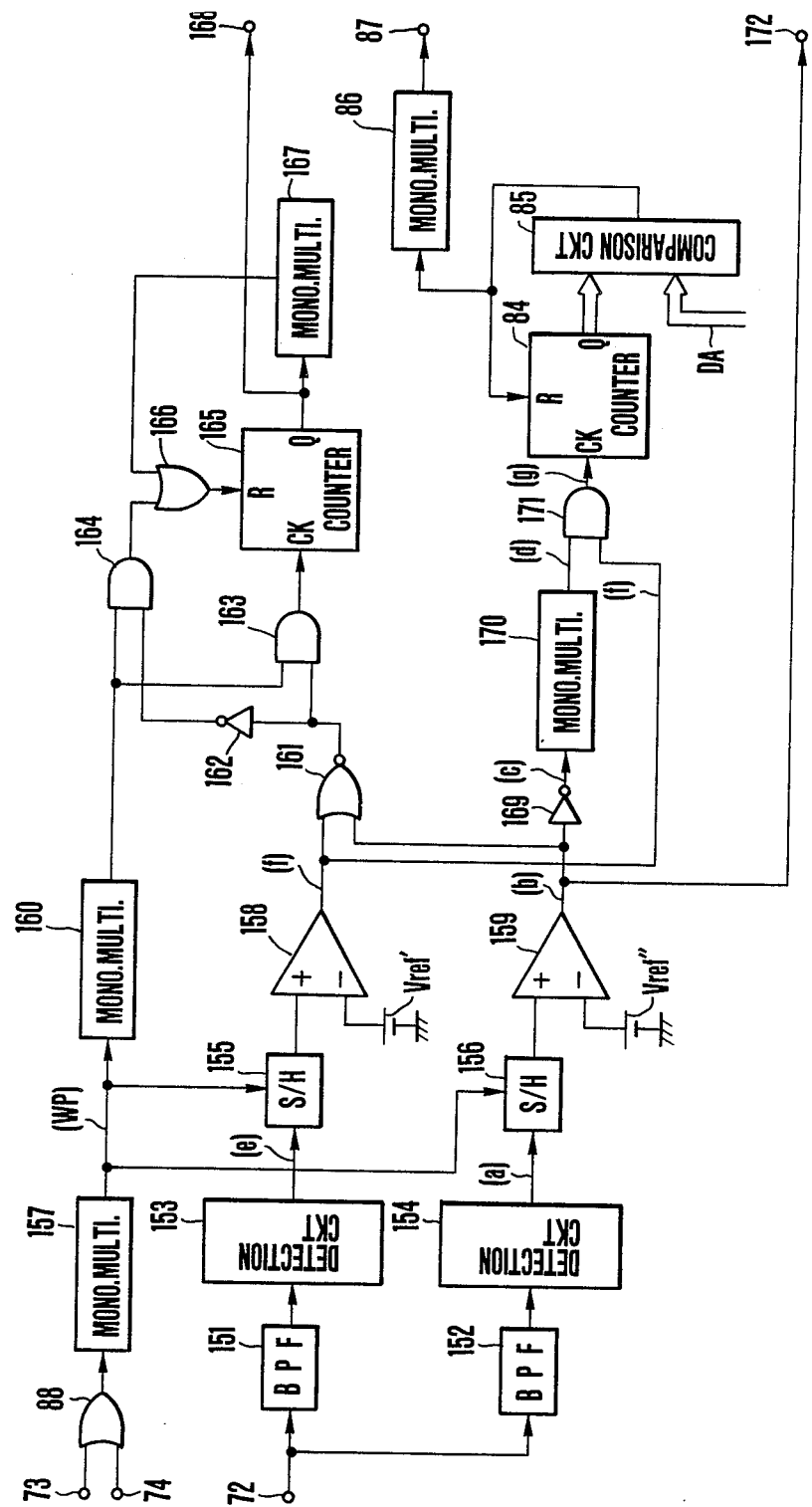
FIG. 9 is a circuit diagram showing in detail the arrangement of a leader detecting circuit included in the embodiment shown in FIG. 4.
Figure 10:
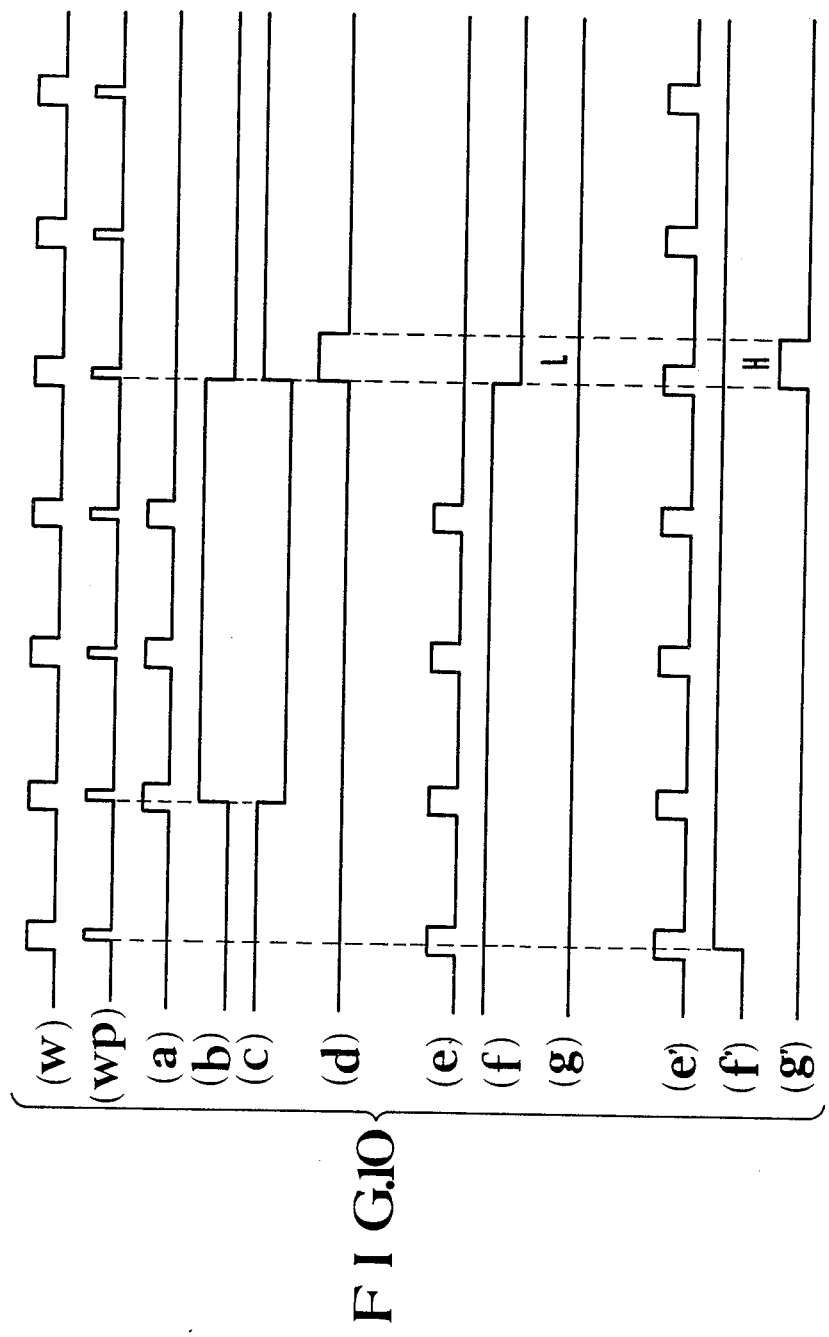
FIG. 10 is a timing chart showing the operation of the circuit of FIG. 9.

The leader or head search operation and a blank search operation are performed as follows: FIG. 9 shows by way of example the details of arrangement of the leader detecting circuit 52 of FIG. 4. FIG. 10 shows in a timing chart the wave forms of the outputs of various parts of FIG. 9. Referring to these drawings, a terminal 72 is arranged to receive a reproduced signal from the gate circuit 28. The reproduced signal is supplied to band-pass filters (BPF's) 151 and 152 to have frequency components f5 and f6 respectively separated from the reproduced signal. The outputs of the BPF's 151 and 152 are supplied to sample-and-hold circuits 155 and 156 (hereinafter referred to as S/H circuits) after they are level detected by detection circuits 153 and 154. Further, the frequencies f5 and f6 are arranged to be set at sufficiently low values to be not affected by azimuth recording.

A monostable multivibrator (MM) 157 is triggered by the rise of the logical sum of gate pulses for the heads 3 and 4. The fall of the logical sum coincides with a timing at which the middle part of each area is traced. The S/H's 155 and 156 operate at that timing. The outputs of the S/H's 155 and 156 are supplied to comparison circuits 158 and 159 to be compared with reference levels Vref' and Vref" respectively. In the case of presence of the frequencies f5 and f6 of the pilot signals, the comparison circuits 158 and 159 produce high level outputs. An MM 160 is arranged to produce a pulse immediately after the sampling operation.

The output (b) of the comparison circuit 159 is inverted by an inverter 169. An MM 170 is triggered by the rise of the output (c) of the inverter 169 and is arranged to produce a high level output (d) for a predetermined period of time. If the output (f) of the comparison circuit 158 is at a high level during this period, the output (g) of an AND gate 171 is at a high level as long as the output of the MM 170 is at the high level. Further, if the output (f) of the comparator 158 is at a low level during that period, the output (g) of the AND gate 171 remains at a low level.

The reason for this arrangement is as follows: Generally, when the operator records some tune, mute parts arise at the beginning and the end of the tune. Then, if preceding and ensuing parts are unrecorded, one tune would be mistaken for two tunes. This brings about a problem in carrying out a search operation called a several-tunes-skipping leader search which will be described later. To solve this problem, it is arranged to always detect the leader portion of each tune and to nullify the detection of the pilot signal of the frequency f6 which corresponds to the mute part located at the end of the tune.

The embodiment is provided with a counter 84 for the purpose of performing the several-tunes-skipping leader search. The counter 84 is arranged to count the output (g) of the AND gate 171. Meanwhile, the counter 84 is in possession of data DA which is received from the operation part 24 indicative of the location of the leader part of a program to be detected relative to the program being currently traced. A comparison circuit 85 produces a tape stopping instruction pulse when the counted value of the counter 84 comes to coincide with the data DA. This pulse signal is supplied via an MM 86 and a terminal 87 to the capstan controller 53 which will be described later. The data DA is arranged to be "n" irrespective as to whether the program designated is located "n" programs after (+n) the currently traced program or "n" programs before (−n) the current one.

When the heads 3 and 4 enter a part where no PCM audio signal is recorded within the designated area, the output levels of comparison circuits 158 and 159 become low. As a result, that of a NOR gate 161 becomes high. After the change of the output level of the NOR gate 161 to a high level, an AND gate 163 supplies a counter 165 with pulses produced from an MM 160. The counter 165 counts a predetermined consecutive number of these pulses. Upon completion of the count, the counter 165 supplies its high level Q output via a terminal 168 to the capstan controller 53. Upon receipt of this, the capstan controller 53 brings the tape travel to a stop.

An inverter 162 and an AND gate 164 are arranged to have the counter 165 produce a high level output only when a part having no audio signal recorded therein is continuously detected. In other words, for the purpose of preventing any mis-detection, the counter 165 is reset by them when the pilot signal of either the frequency f5 or f6 is reproduced. Further, an MM 167 and an OR gate 166 are arranged to render the counter 165 inoperative for a while once detection is made.

Figure 11:
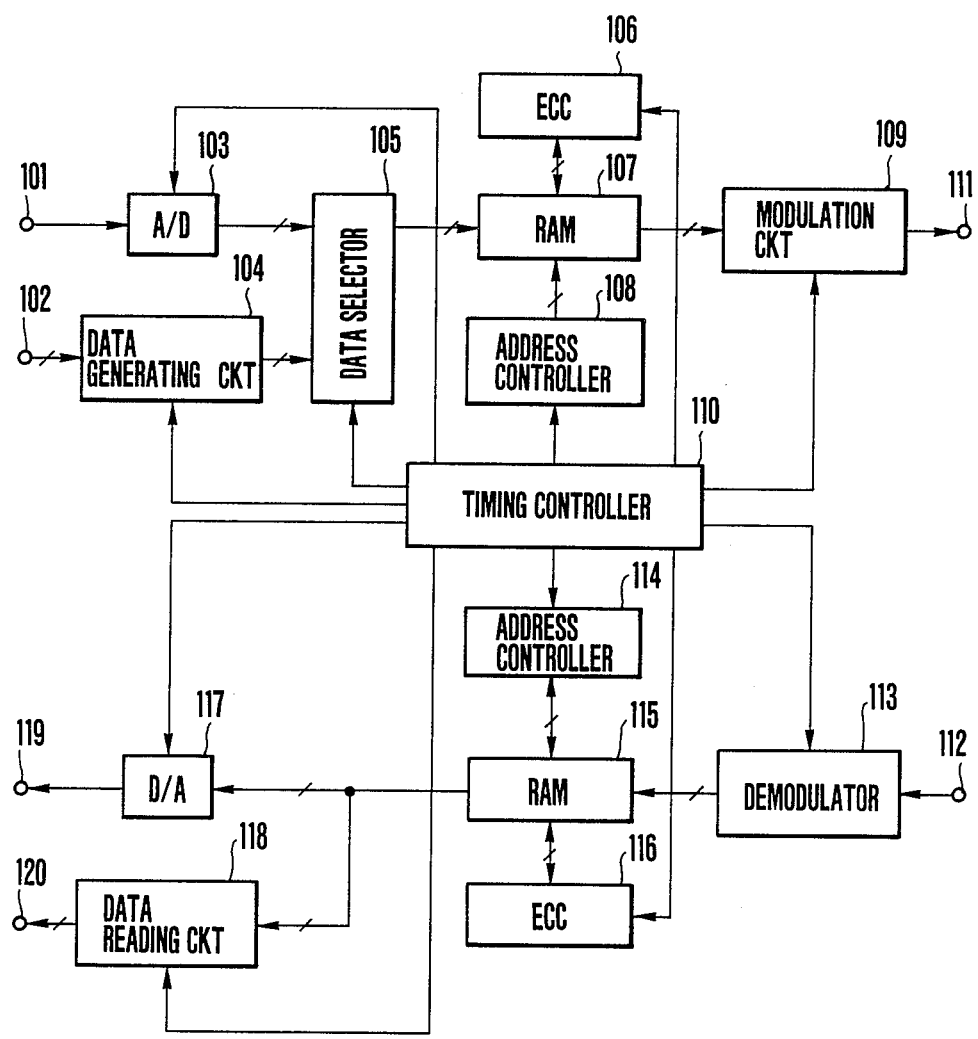
FIG. 11 is a circuit diagram showing in detail a PCM audio signal processing circuit included in the embodiment shown in FIG. 4.

Recording and reproduction of FR signal mentioned in the foregoing are performed in the following manner: FIG. 11 shows by way of example the details of arrangement of the PCM audio signal processing circuit 30 shown in FIG. 4. Referring to FIG. 11, a terminal 101 is arranged to receive the incoming analog audio signal supplied to the terminal 29. A terminal 102 is arranged to receive the output of the above-stated FR signal generating circuit 56. Further, the FR signal generating circuit 56 is arranged to produce a high level signal when the tape is moved in the reverse direction. When the high level signal is supplied to the terminal 102, a data generating circuit 104 produces data which is arranged to cause a predetermined bit of the data which among other recorded data is to be recorded and reproduced together with audio data which will be described later to become "1". In case that the signal supplied to the terminal 102 is at a low level, the data generating circuit 104 produces data which cause the predetermined bit of the above-stated data to become "0".

Meanwhile, the analog audio signal received at the terminal 101 is supplied to an analog-to-digital converter (A/D converter) 103. The A/D converter 103 samples the analog audio signal, quantizes the sampled signal and supplies it at a given timing to a data selector 105. The data selector 105 is arranged to supply a RAM 107 (random access memory) with the output of the data generating circuit 104 once in every one-field period. At the RAM 107, a parity word (P.Q.) obtained from an error correcting circuit 106 (ECC), check code data, CRCC and other address data obtained from an address controller 108 are arranged together with the data obtained from the above-stated data selector in consideration of cross-interleaving, etc. The RAM 107 supplies a modulation circuit 109 with time-base compressed data. The modulation circuit 109 performs a digital modulating operation such as BPM (by-phase modulation), etc. The output of the modulation circuit 109 is produced from a terminal 111. A digital modulated audio signal which is thus produced from the terminal 111 is supplied to the adder 33 as mentioned in the foregoing.

During reproduction, a digital modulated signal is supplied via the gate circuit 28 to a terminal 112. This signal is demodulated by a demodulator 113 and is then supplied to a RAM 115. The RAM 115 performs a signal processing operation in a manner exactly reverse to that of the other RAM 107. In other words, the data arrangement is changed on the basis of the address data obtained from an address controller 114 and also according to synchronizing data. Errors are corrected by an ECC 116. The data thus processed is produced from the RAM 115 and is supplied to a digital-to-analog converter The D/A converter 117 converts the input into the original analog audio signal. The audio signal is then supplied via a terminal 119 to the mute circuit 55. Then, the mute circuit 55 produces the audio signal from the terminal 36. Meanwhile, the data reading circuit 118 picks up the data corresponding to the above-stated FR signal. If the predetermined bit of the data is "1", the circuit 118 produces a pulse signal at every 1/60 sec. to the FR signal detecting circuit 57 via a terminal 100. All the component elements of the signal processing circut 30 shown in FIG. 11 are arranged to operate in synchronism with a timing signal produced from a timing controller 110.

Figure 12:
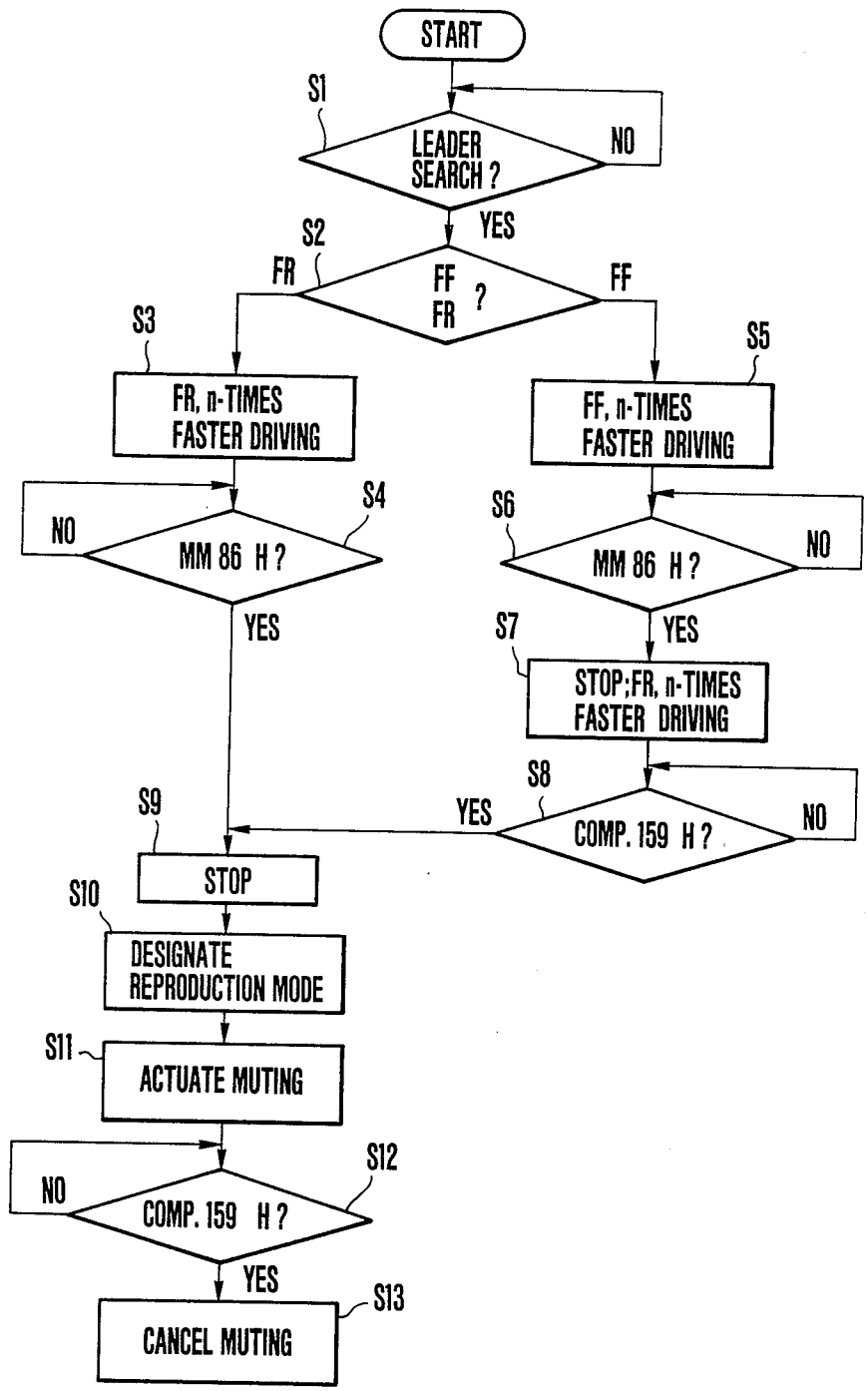
FIG. 12 is a flow chart showing by way of example the operation of a capstan controller included in the embodiment shown in FIG. 4.

The capstan controller 53 of FIG. 4 operates in the following manner: FIG. 12 shows by way of example in a flow chart the operation of the capstan controller 53. FIGS. 13(a) to 13(d) show the control of the capstan controller 53 over the travel of the recording medium. In the case of the flow chart of FIG. 12, the direction in which the medium or tape is allowed to travel for recording is predetermined. Referring to FIG. 12, a leader search instruction is issued from the operation part 24 at a step S1. Then, the capstan motor control circuit 20 is controlled as follows: If this instruction is for a leader search by moving the tape fast forward (FF), the tape is quickly moved forward at a speed "n" times as fast as the recording tape travel speed (at a step S5). If it is for a search by rewinding the tape (FR), the tape is quickly rewound or moved in the reverse direction at a speed "n" times as fast as the recording speed (at a step S3). The system controller 25 of course has performed area designation by then. The gate circuit 28 thus has been operated by the gate pulse produced from the gate pulse generating circuit 23.

During the remaining part of process of the leader search, a part of the record corresponding to the period T3 indicated by the above-stated data DA is detected when the monostable multivibrator (MM) 86 of FIG. 9 comes to produce a high level output (at a step S4). The travel of the tape 1 is then brought to a stop (at a step S9). Then, the capstan motor control circuit 20 and the system controller 25 is further controlled to initiate reproduction (at a step S10).

At the same time, the system controller 25 actuates the muting circuit 55 (at a step S11). After that, the tape is allowed to travel at a normal speed in the same direction as the direction taken in recording. Following that, when the output level of the comparison circuit 159 changes to a high level, this indicates that the pilot signal of the above-stated frequency f6 has come to be reproduced (at a step S12). A mute state is then cancelled by stopping the muting circuit 55 from operating (at a step S13). The details of this are as shown in FIG. 13(d).

Figure 13:
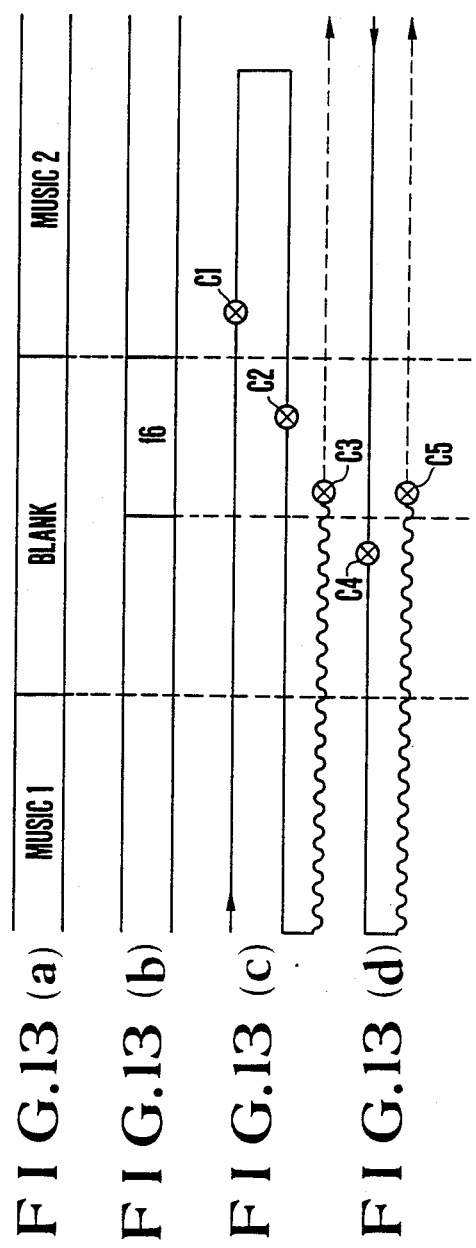
FIGS. 13(a) to 13(d) show tape travel control to be performed by the capstan controller of FIG. 4 in relation to the flow chart of FIG. 12.

Referring to FIG. 13(d), there is a mute part BLANK as an interlude part in between tunes MUSIC 1 and MUSIC 2. The above-stated pilot signal of the frequency f6 is record at a part corresponding to this mute part BLANK. However, it is when the pilot signal of the frequency f5 is detected after detection of the pilot signal of the frequency f6 that the output of the MM 86 comes to be actually obtained as indicated at a point C4 in FIG. 13(d). When an instruction for shifting to the reproduction mode is issued at the point of time C4, an actual shift to the reproduction mode takes place due to the inertia when the heads 3 and 4 come to trace a part of the tape 1 immediately before the end of the tune MUSIC 1. During a period indicated by a wave line, the tape 1 travels under the tracking control of the ATF circuit 37 in the same manner as in ordinary reproduction. However, the output audio signal is muted until the pilot signal of the frequency f6 is detected at the point of time C5. Therefore, effective reproduction is performed during a period indicated by a broken line.

During the process of the fast forward feeding leader search, when a high level output is produced from the MM 86 (at a step S6), the travel of the tape 1 is temporarily brought to a stop. The tape 1 is then allowed to travel in the reverse direction. In other words, rewinding begins (at a step S7). Then, in case that the output level of the comparison circuit of FIG. 9 becomes high (at a step S8), the tape 1 is temporarily brought to a stop and reproduction begins in the same manner as shown in steps S9 to S13. The details of this are as shown in FIG. 13(c).

Referring to FIG. 13(c), the output level of the MM 86 becomes high at a point of time C1. Then, due to the inertia, the "n" times faster rewinding operation is performed after the point of time C1. As a result, this time the output level of the comparison circuit 159 becomes high at a point of time C2. The tape 1 is brought to a stop and a shift to the reproduction mode takes place. However, the output audio signal is muted until the pilot signal of the frequency f6 is detected at a point of time C3.

Despite of its relatively simple structural arrangement, the tape recorder which is arranged as described above according to this invention reliably permits reproduction from a desired part of the record without lowering the search or look-up speed.

Figure 14:
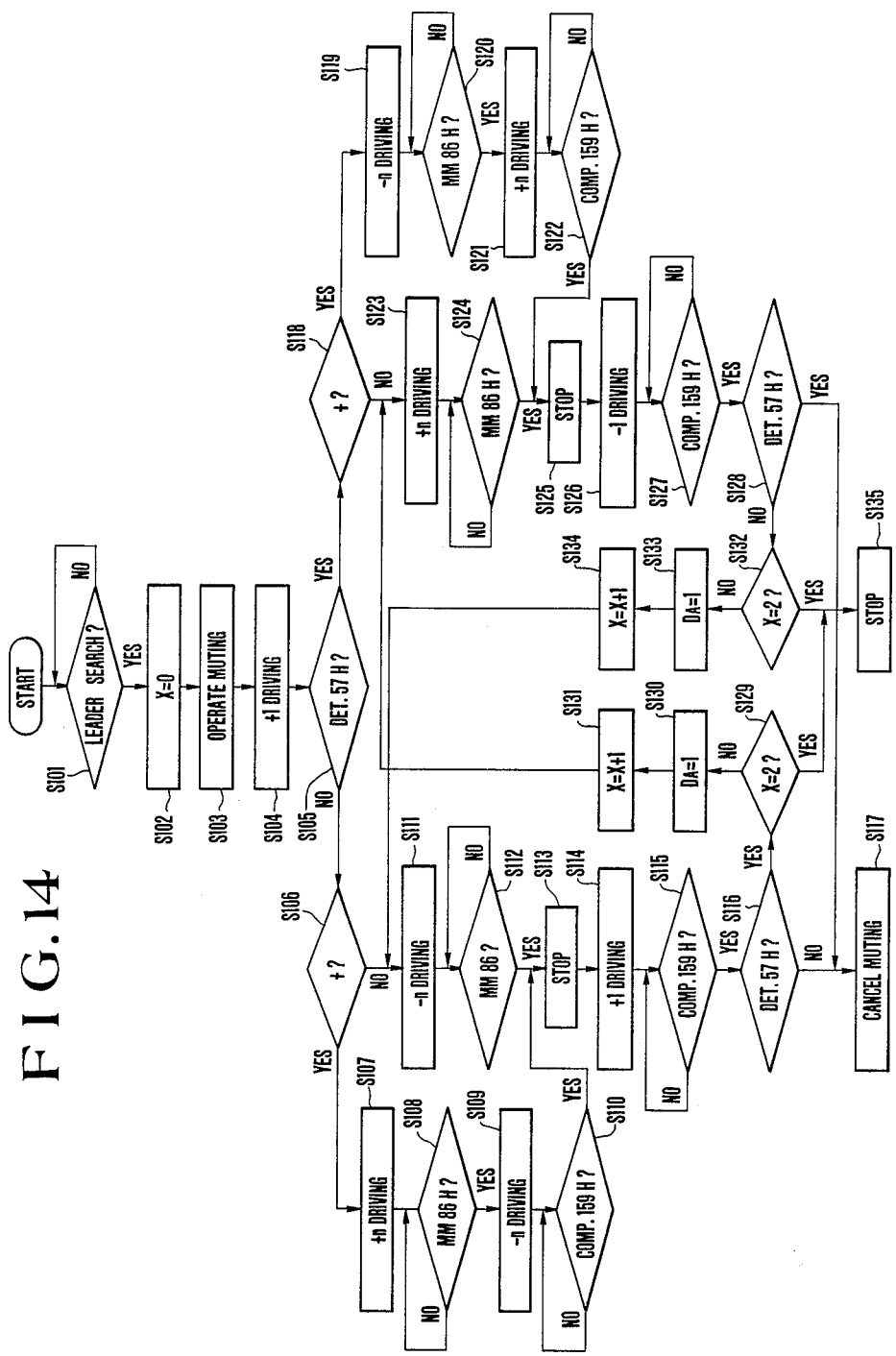
FIG. 14 is a flow chart showing another example of the operation of the capstan controller included in the embodiment shown in FIG. 4.
Figure 15:
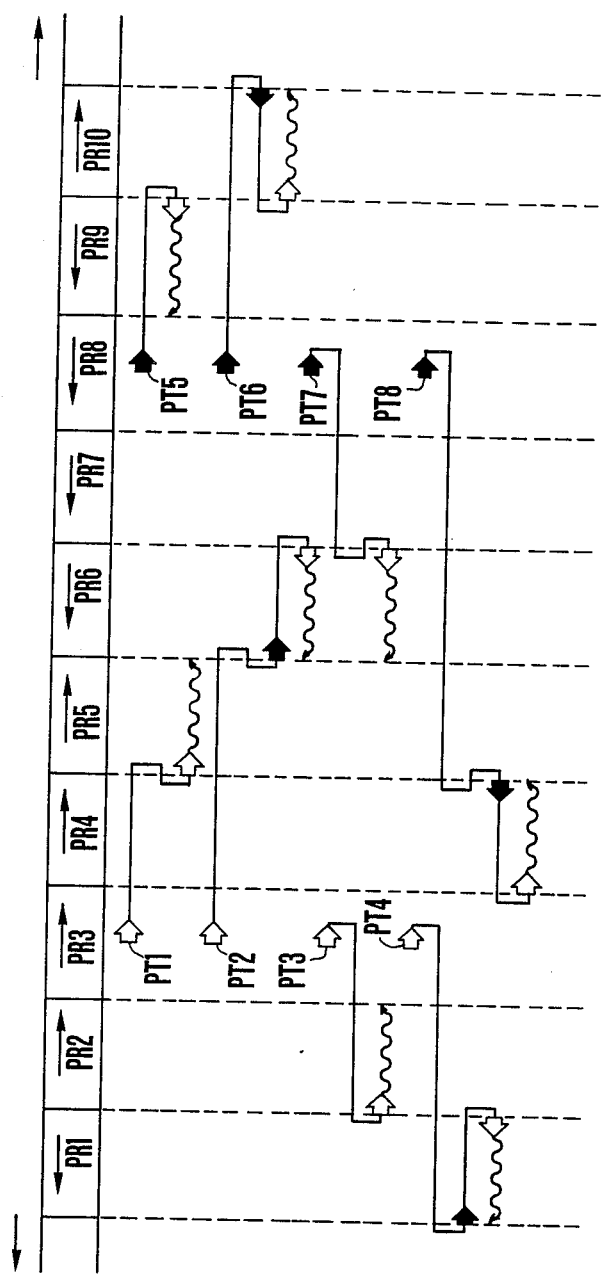
FIG. 15 is an illustration of tape travel control to be performed by the capstan controller of FIG. 4 in relation to the flow chart of FIG. 14.

In case that the tape travel direction can be set either in the forward or reverse direction in recording an audio signal, the capstan controller 53 operates as shown in another flow chart in FIG. 14. FIG. 15 shows the control operation of the controller 53 over the travel of the recording medium.

When a leader search instruction is issued from the operation part 24 (at a step S101 of FIG. 14), a variable X which will be described later is set at "0" (at a step S102). After that, a reproduced audio signal is prohibited from being produced with the muting circuit 55 caused to operate via the system controller 25 (at a step S103). The tape is then moved in the forward direction at the same speed as the speed taken in recording (at a step S104) to obtain a condition in which data corresponding to the above-stated FR signal is reproducible.

If the tape travel direction taken in recording was the forward or positive direction, the FR signal detecting circuit 57 supplies a low level signal to the capstan controller 53. If it was the reverse or negative direction, the circuit 57 supplies a high level signal to the controller 53. At a step S105 of FIG. 14, the signal thus produced from the FR signal detecting circuit 57 is used in discriminating the tape travel or moving direction taken in recording. At a step S106 or S118, a program searching operation is determined according to information from the operation part 24 as to whether the search is to be made for a subsequent program (+search) or for a preceding program (−search). The further operation of the controller 53 will be described with reference to FIG. 15. Audio programs PR1 to PR10 are assumed to be recorded on the recording medium or tape. The pilot signal of the frequency f6 which corresponds to a mute part is assumed to be recorded for at least 60 recording tracks between one program and another located adjacent to each other. Arrows shown above the symbols PR1 to PR10 indicate respectively the directions in which the audio signals are recorded. Reference symbols PT1 to PT8 show different leader searching control patterns. The patterns PT1 to PT4 represent leader search control performed after the recording direction is found forward or positive at the step S105. The patterns PT5 to PT8 represent the leader search control performed after the recording direction is found negative. The patterns PT1, PT2, PT7 and PT8 represent "+" search control and the patterns PT3 to PT6 "−" search control.

The operation in the pattern PT1 is as follows: The positive recording tape travel direction is discriminated at the step S105, that is, the output of the FR signal detecting circuit 57 is found to be at a low level. When an instruction for "+" search is found at a step S106, the tape is first driven to travel in the positive or forward direction at the "n" times faster speed (at a step S107). Then, when a high level output is produced from the MM 86 of FIG. 9 (at a step S108), this indicates that a part corresponding to the period T3 indicated by the above-stated data DA is detected. The tape is then caused to travel at the "n" times faster speed in the negative direction this time (at a step S109). When the output level of the comparison circuit 159 changes to a high level, the pilot signal of the frequency f6 again comes to be reproduced (at a step S110). The travel of the tape is then temporarily brought to a stop, (at a step S113). After that, the tape is again driven to travel in the positive direction at a normal speed (at a step S114). When (at a step S115) it is detected from the output of the comparison circuit 159 that the pilot signal of the frequency f6 again has come to be reproduced, it is confirmed that this part is recorded in the positive direction (at a step S116). After this confirmation, the muting circuit 55 is rendered inoperative to cancel the muting state (at a step S117). Then, a reproducing operation begins. In the case of the pattern PT1 of FIG. 15, the data DA is assumed to be set at "2".

Further, in FIG. 15, full lines indicate the travel of the tape while wave lines indicate reproduction. Void arrows indicate detection of that the tape travel direction coincides with the direction taken in recording. Black arrows indicate detection of that the tape travel direction is reverse to the recording direction.

The above-stated process of bringing the tape travel temporarily to a stop is as shown in FIG. 13(c).

Next, the operation in the pattern PT3 is as follows: With recording in the positive or forward direction found at the step S105 and the search in the negative or "—" direction found at the step S106 respectively, the tape is driven to travel in the negative direction at the "n" times faster speed (at a step S111). Then, under the condition of the data DA=2, when the MM 86 comes to produce a high level output (at a step S112), the tape is temporarily brought to a stop (at a step S113). After that, the tape is driven to travel in the positive direction at the normal speed (at a step S114). Then, when the pilot signal of the frequency f6 is again detected (at a step S115), recording in the positive direction is confirmed (at a step S115), the muting state is cancelled and reproduction is performed (at a step S117). The details of this process is as shown in FIG. 13(d).

In case that a search is to be made from a part where the recording direction is the negative direction, the operation is performed as follows: The control operation pattern PT5 is for a "—" search and the pattern PT7 for a "+" search. In both cases, the data DA is set at "2". With the recording in the negative direction detected at the step S105, a discrimination is made between a "+" search and a "—" search at a step S118. In the case of the "—" search, the tape is driven to travel in the positive direction at the "n" times faster speed at a step S123. The search for a program comes to an end when the output level of the MM 86 changes to a high level at a step S124. Then, the tape is temporarily brought to a stop at a step S125. In the event of the "+" search on the other hand, the tape is driven to travel in the negative direction at the "n" times faster speed at a step S119. When the output level of the MM 86 changes to a high level at a step S120, the tape is driven to travel in the positive direction at the "n" times faster speed at a step S121. Next, when the output level of the comparison circuit 159 changes to a high level at a step S122, the tape is temporarily brought to a stop at a step S125. After that, the tape is driven to travel in the negative direction at the normal speed at a step S126. When again the output level of the comparison circuit 159 changes to a high level at a step S127, it is confirmed that the part of the tape obtained then is recorded in the negative direction (at a step S128). After this confirmation, the muting state is cancelled and reproduction begins at a step S117.

Each of the control operation patterns PT2, PT4, PT6 and PT8 applies to a case where a program to be looked up is recorded in the direction opposite to the direction in which a program located in the initial point of the search is recorded. The operation in this case is as follows: At the point of time of the step S116 or S128, if the output of the FR signal detecting circuit 57 is not coinciding with the recording direction of the part immediately before the search, the data DA is shifted to "1" (at a step S130 or S133). The tape is driven to travel at the "n" times faster speed in the direction reverse to the recording direction obtained immediately before commencement of the search or look-up, i.e. reverse to the recording direction of the program already searched (at a step S123 or S111). The tape is brought to a stop immediately before the initial recording point of the program (at a step S125 or S113). Then, the tape is driven to travel at the normal speed in the recording direction of the program. Then, since the tape is travelling in the same direction as the recording direction this time (at a step S128 or S116), the muting state is cancelled and reproduction is allowed to begin at a step S117.

In this instance, if the tape travelling direction does not coincide with the recording direction, it suggests some detection error. In that event, for caution's sake, the tape is allowed to travel to the opposite end of the applicable program. During this process, the variable X becomes "2" at steps S131 and S134. Then, if the tape travel direction still does not come to coincide, the variable X=2 is detected (at steps S129 and S132) and the tape is brought to a stop at a step S135.

In the case of a format where the tape travel direction for recording is fixed and remains unchanged for every area, no consideration is required for the patterns PT2, PT4, PT6 and PT8. Further, even if there is some non-recorded part in between one program and another, the presence of such part causes no error in counting, that is, causes no erroneous search operation.

The tape recorder which is arranged as described above imposes no severe restriction on the format of the recording medium and permits look-up for a desired recorded program in a state of constantly detecting the recording direction. A desired program can be quickly found out and can be adequately reproduced.

While a digital modulated recording (PCM) is alone taken up in the foregoing description, the same advantageous effect is attainable with this invention applied to an audio signal recorder of the type performing analog FM modulated recording.

The number of channels, that is, the number of longitudinal areas is not limited to six areas. This invention is likewise applicable also to a digital audio tape recorder (DAT) of the single area type.

Further, in the embodiment described, the recording direction is arranged to be detectable with recording direction indicating data recorded along with the audio data. However, this detecting method may be replaced with some other suitable method. For example, the recording direction can be found by detecting a difference or a change arising in the rotation sequence of the frequencies of pilot signals (TPS's) recorded in accordance with the known four-frequency method.

What is claimed is:

1. An audio signal reproducing apparatus for reproducing audio signals from a tape-shaped recording medium on which said audio signals are recorded together with mark signals respectively showing the longitudinal positions of said audio signals along said recording medium, comprising:
   (a) moving means for moving said medium in the longitudinal direction thereof;
   (b) first reproducing means for reproducing said audio signals from said medium;
   (c) second reproducing means for reproducing said mark signals from said medium;
   (d) look-up means responsive to said second reproducing means for looking up one of said mark signals recorded on the medium;
   (e) instruction means for instructing said look-up means to begin to look up one of said mark signals;
   (f) detection means for detecting a medium moving direction taken in recording said audio signals and producing a direction signal; and
   (g) control means for controlling, in response to an instruction received from said instruction means, said moving means to begin to move said medium in the direction determined on the basis of said direction signal produced from said detection means.

2. An apparatus according to claim 1, wherein said tape-shaped recording medium has a pluraltiy of areas extending in the longitudinal direction thereof; and said audio signals and said mark signals are recorded in each of said areas.

3. An apparatus according to claim 2, further comprising designating means for designating one of said plurality of areas for reproduction by said first reproducing means.

4. An apparatus according to claim 3, wherein said second reproducing means is arranged to reproduce said mark signals recorded within the area designated by said designating means.

5. An apparatus according to claim 1, wherein said look-up means includes counting means for counting a number of times for which the mark signals are reproduced by said second reproducing means after commencement of the look-up operation of said look-up means.

6. An apparatus according to claim 5, wherein said instruction means includes a first instructing means for designating a relative direction in which said medium is to be moved for thelook-up operation to a medium moving direction taken in recording and a second instructing means arranged to generate numerical data indicative of the sequential position of a specific mark signal among siad mark signals to be detected by said detecting means.

7. An apparatus according to claim 6, wherein said look-up means further includes comparison means for comparing the counted data obtained from said counting means with the numerical data generated by said second instructing means.

8. An apparatus according to claim 1, further comprising first means responsive to said look-up means for controlling said moving means to bring the movement of said medium to a stop in response to completion of the look-up performed by said look-up means.

9. An apparatus according to claim 8, further comprising second means responsive to said first means for controlling said moving means after completion of the operation of said first means to cause the moving means to move said medium in the direction discriminated by said discriminating means at the same speed as a medium moving speed employed in recording.

10. An apparatus according to claim 9, further comprising third means which, after completion of the operation of said second means and in response thereto, acts to cause said reproducing means to begin to reproduce said audio signals.

11. An apparatus according to claim 9, wherein, after completion of the operation of said first means and in response thereto, said second means acts to cause said discriminating means to discriminate the medium moving direction taken in recording said audio signals.

12. An apparatus according to claim 1, further comprising muting means responsive to said look-up means for muting audio signals reproduced by said reproducing means at least for a period of time during which said look-up means is performing a look-up operation.

13. An apparatus according to claim 1, wherein indication signals for indicating the medium moving direction taken in recording said audio signals are recorded on said medium along with said audio signals.

14. An apparatus according to claim 13, wherein said detection means is arranged to perform said detecting operation by using said indication signal reproduced by said first reproducing means.

15. An apparatus according to claim 14, wherein said audio signals and said indication signals respectively include digital data which form one data sequence.

16. An apparatus according to claim 15, wherein said mark signals are frequency multiplexed with a signal which includes said data sequence.

17. An apparatus according to claim 14, wherein said first reproducing means includes at least one rotary head which is arranged to trace said tape-shaped recording medium widthwise.

18. An audio signal reproducing apparatus for reproducing audio signals from a tape-shaped recording medium on which said audio signals are recorded together with mark signals respectively showing the longitudinal positions of said audio signals along said medium, comprising:
   (a) moving means for moving said medium in the longitudinal direction thereof;
   (b) first reproducing means for reproducing said audio signals from said medium;
   (c) second reproducing means for reproducing said mark signals from said medium;
   (d) detection means for detecting the direction in which said medium is allowed to travel when said audio signals are recorded, and producing a direction signal;
   (e) finding means for finding on the basis of said direction signal produced by said detection means that the moving direction of said medium is reverse to the moving direction of said medium taken in recording when said medium is moved by said moving means at a first speed which is the same as said recording speed taken; and (f) control means responsive to said finding means for controlling said moving means to cause said moving means to move said medium at a second speed which is faster than said first speed in the direction reverse to the direction taken in recording until one of said mark signals is reproduced by said second reproducing means.

19. An apparatus according to claim 18, further comprising look-up means responsive to said reproducing means for looking up one of said mark signals recorded on the medium by causing said moving means to move said medium at said second speed.

20. An apparatus according to claim 19, wherein said look-up means includes means for instructing said look-up to look up the sequential position of a specific mark signal among said mark signals to be detected by said detecting means.

21. An apparatus according to claim 20, wherein said control means causes said instructing means to instruct said look-up means to look up one of said mark signals first detected by said detecting means.

22. An apparatus according to claim 19, further comprising means responsive to said look up means for causing said moving means to move said medium at said first speed after completion of the look-up operation of said look up means for one of said mark signals.

23. An audio signal reproducing apparatus for reproducing audio signals from a tape-shaped recording medium on which said audio signals are recorded together with mark signals respectively showing specific longitudinal positions of said audio signals along said medium, comprising:
   (a) moving means for moving said medium in the longitudinal direction thereof;
   (b) first reproducing means for reproducing said audio signals from said medium;
   (c) second reproducing means for reproducing said mark signals from the medium;
   (d) look-up means responsive to said second reproducing means for looking up one of said mark signals recorded on said medium;
   (e) detection means for detecting the medium moving direction taken in recording said audio signals and producing a direction signal; and
   (f) control means responsive to said look-up means for controlling the reproducing operation of said reproducing means on the basis of said direction signal produced by said detection means after completion of the look-up operation of said look-up means.

24. An apparatus according to claim 23, wherein said look-up means is arranged to cause, during the process of the look-up operation thereof, said moving means to move said medium at a first speed which is faster than the medium moving speed employed in recording.

25. An apparatus according to claim 24, wherein said control means includes means for causing said moving means to move, after completion of the look-up by said look-up means, said medium at a second speed which is the same as the medium moving speed employed in recording.

26. An apparatus according to claim 25, wherein said control means further includes first finding means for finding reproduction of one of said mark signals by said second reproducing means when said medium is travelling at said second speed.

27. An apparatus according to claim 26, wherein said control means further includes second finding means for finding, on the basis of said direction signal produced by said detection means after finding by said first finding means, whether the medium moving direction coincides with the medium moving direction taken in recording.

28. An apparatus according to claim 27, wherein said control means further includes means for causing, on the basis of an output of said second finding means, said reproducing means to begin to reproduce said audio signals.

29. An audio signal reproducing apparatus for reproducing audio signals from a tape-shaped recording medium on which said audio signals are recorded together with mark signals showing respectively the longitudinal positions of said audio signals along said medium, comprising:
   (a) moving means for moving said medium in the longitudinal direction thereof;
   (b) first reproducing means for reproducing said audio signals from said medium;
   (c) second reproducing means for reproducing said mark signals from said medium;
   (d) look-up means responsive to said second reproducing means for looking up one of said mark signals recorded on said medium;
   (e) stopping means responsive to said look-up means for stopping said medium at a position where said medium enables said reproducing means to reproduce a part of one of said audio signals recorded on said medium immediately before said one of the mark siganls found by said look-up means;
   (f) control means responsive to said stopping means for controlling said moving means to cause said moving means, after said medium is brought to a stop by said stopping means, to move said medium in the same direction as the medium moving direction taken in recording;
   (g) detecting means responsive to said second reproducing means for detecting, while said medium is on the move under the control of said control means, that said one of the mark signals found by said look-up means is reproduced by said second reproducing means; and
   (h) muting means responsive to said look-up means and said detecting means for muting said audio signals reproduced by said first reproducing means after commencement of the look-up operation of said look-up means until completion of detection by said detecting means.

* * * * *

UNITED STATES PATENT AND TRADEMARK OFFICE
CERTIFICATE OF CORRECTION

PATENT NO. : 4,766,507
DATED : August 23, 1988
INVENTOR(S) : Motokazu Kashida et al.

It is certified that error appears in the above-identified patent and that said Letters Patent is hereby corrected as shown below:

```
Col. 1, line 46, change "compaying" to -- companying --.
Col. 3, line 39, change "phse" to -- phase --.
Col. 5, line 5, change ";" to -- , --.
Col. 12, line 25, change "quantizes" to -- quantifies --.
Col. 12, line 55, after "converter", insert -- (DA converter)
      117 and a data reading circuit 118. --
Col. 13, line 45, change "record" to -- recorded --.
Col. 14, line 15, delete "of".
Col. 15, line 29, delete "of".
Col. 15, line 31, delete "of".
Col. 17, line 58, change "thelook-up" to -- the look-up --.
Col. 17, line 62, change "siad" to -- said --.
Col. 20, line 40, change "siganls" to -- signals --.
```

Signed and Sealed this

Twentieth Day of December, 1988

Attest:

DONALD J. QUIGG

*Attesting Officer*  *Commissioner of Patents and Trademarks*